US008846558B2

(12) United States Patent
Cheng et al.

(10) Patent No.: US 8,846,558 B2
(45) Date of Patent: Sep. 30, 2014

(54) FUNCTIONALIZATION OF THE INTERNAL SURFACES OF ZEOLITES WITH ALCOHOL COMPOUNDS

(75) Inventors: Chil-Hung Cheng, Dundas (CA); Christopher Jones, Mableton, GA (US); Sankar Nair, Atlanta, GA (US); Ronald R. Chance, Naples, FL (US); Benjamin A. McCool, Lambertville, NJ (US); Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 418 days.

(21) Appl. No.: 12/460,115

(22) Filed: Jul. 14, 2009

(65) Prior Publication Data

US 2010/0016619 A1 Jan. 21, 2010

Related U.S. Application Data

(60) Provisional application No. 61/135,313, filed on Jul. 18, 2008.

(51) Int. Cl.
*B01J 29/06* (2006.01)
*C01B 39/02* (2006.01)

(52) U.S. Cl.
CPC .................................. *C01B 39/026* (2013.01)
USPC ........................................................ 502/62

(58) Field of Classification Search
USPC ........................................................ 502/62
See application file for complete search history.

(56) References Cited

U.S. PATENT DOCUMENTS

| | | | |
|---|---|---|---|
| 6,326,326 B1 | 12/2001 | Feng et al. | |
| 6,331,500 B1 | 12/2001 | Tsuji et al. | |
| 7,041,774 B2 | 5/2006 | Kishan et al. | |
| 2006/0063662 A1 | 3/2006 | Hata et al. | |
| 2008/0053902 A1 | 3/2008 | Koegler et al. | |

FOREIGN PATENT DOCUMENTS

| WO | WO 2005/003029 A2 | 1/2005 |
|---|---|---|
| WO | WO 2007/043731 A1 | 4/2007 |

OTHER PUBLICATIONS

Kawai et al., "Reactivity of silanol groups on zeolite surfaces", Colloid Polymer Sco., 276, 992-998, 1998.*
Hiroshi Utsugi, Hideo Horikoshi, Toshiharu Matsuzawa, Mechanism of Esterification of Alcohols with Surface Silanols and Hydrolysis of Surface Esters on Silica Gels, Journal of Colloid and Interface Science, vol. 50, No. 1, Jan. 1975, pp. 154-161.
Gabriel C. Ossenkamp, Tim Kemmitt, Jim H. Johnston; "Toward Functionalized Surfaces through Surface Esterification of Silica"; Langmuir, 2002, 18, pp. 5749-5754.

G. Mertens, J. J. Fripiat; "The Methanol-Silica Gel System III. Kinetics of the Methoxylation Process," Journal of Colloid and Interface Science, vol. 42, No. 1, Jan. 1973, pp. 169-180.
Chil-Hung Creng, Tae-Hyun Bae, Benjamin A. McCool, Ronald R. Chance, Sankar Nair, Christopher W. Jones; "Functionalization of the Internal Surface of Pure-Silica MFI Zeolite with Aliphatic Alcohols," J. Phys. Chem. C, 2008, 112, pp. 3543-3551.
C. C. Ballard, E. C. Broge, R.K. Iler, D.S. St. John, J.L R. McWhorter; "Esterification of the Surface of Amorphous Silica," J. Phys. Chem., 1961, vol. 65, pp. 20-25.
J. Datka, E. Tuznik; "Hydroxyl groups and acid sites in Na-ZSM-5 zeolites studied by i.r. spectroscopy," Zeolites, 1985, vol. 5, pp. 230-232.
E. M. Flanigen, J. M. Bennett, R. W. Grose, J. P. Cohen, R. L. Patton, R. M. Kirchner, "Silicalite, a new hydrophobic crystallinesilica molecular sieve," Nature, vol. 271, Feb. 1978, pp. 512-516.
T. Kimura, K. Kuroda, Y. Sugahara, K. Kuroda, "Esterification of the Silanol Groups in the Mesoporous Silica Derived from Kanemite," Journal of Porous Materials 5, 1998, pp. 127-132.
T. Ishikawa, M. Matsuda, a.Yasukawa, K. Kandori, S. Inagaki, T. Fukushima, S. Kondo, "Surface sitanol groups of mesoporous silica FSM-16," J. Chem.Soc., Faraday Trans., 1996, 92(11), pp. 1985-1989.
J-M. Chezeau, L. Delmotte, J-L Guth, M. Soulard, "High-resolution solid-state $^{29}$Si and $^{13}$C n.m.r. on highly siliceous MFI-type zeolites synthesized in nonalkaline fluoride medium," Zeoliltes, 1989, vol. 9, January, pp. 78-80.
V. Bosacek, "Formation of Surface-Bonded Methoxy Groups in the Sorption of Methanol and Methyl Iodide on Zeolites Studied by $^{13}$C MAS NMR Spectroscopy," J. Phys. Chem., 1993, 97, pp. 10732-10737.
D. D. Kragten, J. M. Fedeyko, K. R. Sawant, J.D. Rimer, D. G. Vlachos, R. F. Lobo, "Structure of the Silica Phase Extracted from Silica/(TPA)OH Solutions Containing Nanopartiacles," J. Phys. Chem. B, 2003, 107, pp. 10006-10016.
C. S. Carr, S. Kaskel, D. F. Shanatz, "Self-Assembly of Colloidal Zeolite Precursors into Extended Hierarchically Ordered Solids," Chem. Mater. 2004, 16, pp. 3139-3146.
C. A. Fyfe, D. H. Brouwer, A. R. Lewis, J-m. Chezeau, "Location of the Fluoride Ion in Tetrapropylammonium Fluoride Silicalite-1 Determined by $^1$H/$^{19}$F/$^{29}$Si Triple Resonance CP, REDOR, and TEDOR NMR Experiments." J. Am. Chem. Soc. 2001, 123, pp. 6882-6891.
G. E. Maciel, D. W. Sindorf, "Silicon-29 Nuclear Magnetic Resonance Study of the Surface of Silica Gel by Cross Polarization and Magic-Angle Spinning," J. Am. Chem. Soc., 1980, 102, pp. 7606-7607/.

(Continued)

*Primary Examiner* — Elizabeth Wood
(74) *Attorney, Agent, or Firm* — Bruce M. Bordelon; David M. Weisberg

(57) ABSTRACT

The present invention relates to the modification of the internal surfaces of zeolite crystals via treatment with alcohols containing at least four carbon atoms. The modified zeolites possess high thermal stability and the properties of the modified zeolites can be tailored to provide improved performance for use in separations processes.

32 Claims, 16 Drawing Sheets

(56) References Cited

OTHER PUBLICATIONS

N. J. Turro, Z-G. Lei, W. Li, Z. Liu, A. McDermott, M. F. Ottaviani, L. Abrams, "Photochemical and Magnetic Resonance Investigations of the Supramolecular Structure and Dynamics of Molecules and Reactive Radicals onthe External and Internal Surface of MFI Zeolites," J. Am. Chem. Soc., 2000, 122, pp. 11649-11659.

J. D. Rimer, R. F. Lobo, D. G. Vlachos, "Physical Basis for the Formation and Stability of Silica Nanoparticles in Basic Solutions of Monovalent Cations," Langmuir, 2005, 21, pp. 8960-8971.

H. Koller, A. Wolker, L. A. Villaescusa, M. J. Diaz-Cabanas, S. Valencia, M. A. Camblor, "Five-Coordinate Silicon in High-Silica Zeolites," J. Am. Chem. Soc., 1999, 121, pp. 3368-3376.

F. Salehirad, M. W. Anderson, "Solid-State NMR Studies of Adsorption Complexes and Surface Methoxy Groups on Methanol-Sorbed Microporous Materialsl," Journal of Catalysis, 177, (1998) pp. 189-207.

X. S. Zhao, G. Q. Lu, A. K. Whittaker, G. J. Millar, H. Y. Zhu, "Comprehensive Study of Surface Chemistry of MCM-41 Using $^{29}$Si CP/MAS NMR, FTIR, Pyridine-TPD, and TGA," J. Phys. Chem. B, 1997, 101, pp. 6525-6531.

B. J. Schoeman, "A spectroscopic study of the initial stage in the crystallization of TPA-silicalite-1 from clear solutions," Progress in Zeolite and Microporous Materials, Studies in Surface Science and Catalysis, vol. 105, pp. 647-654, 1997.

G. C. Ossenkamp, T. Kemmitt, J. H. Johnston, "New Approaches to Surface-Alkoxylated Silica with Increased Hydrolytic Stability," Chem. Mater., 2001, 13, pp. 3975-3980.

A. G. Pelmenschikov, G. Morosi, A. Gamba, A. Zecchina, S. Bordiga, E. A. Paukshtis, "Mechanisms of Methanol Adsorption on Silicalite and Silica: IR Spectra and ab-Initio Calculations," J. Phys. Chem., 1993, 97, pp. 11979-11986.

F. Genoni, G. P. Casati, R. Buzzoni, S. Palmery, G. Spano, L. Dalloro, G. Petrini, "fair and Thermogravimetric Study of Silicalite Treated with Methanol," Collect. Czech. Chem. Commun., vol. 62, 1997, pp. 1544-1550.

V. Bosacek, R. Klik, F. Genoni, G. Spano, F. Rivetti, F. Figueras, "Terminal and bridging methoxyls on zeolites detected by $^{13}$C magic angle spinning NMR spectroscopy," Magn. Reson. Chem., 37, 1999 pp. Z134-S141.

* cited by examiner

Scanning Electron Microscopy Image of
Synthesized 500 nm MFI Zeolite Particles

Scanning Electron Microscopy Image of
Synthesized 200 nm MFI Zeolite Particles

Scanning Electron Microscopy Image of
Synthesized 100 nm MFI Zeolite Particles

Powder XRD Patterns of 500 nm, 200 nm, and 100 nm Pure-Silica MFI Nanoparticles

Comparison of Theoretical Calculations and Experimental Measurements of the 1-Butanol Loading on Pure-Silica MFI Zeolite Particles $^{13}$C CP-MAS NMR Spectra of 500 nm Pure-Silica MFI Zeolite Particles as Calcined and Treated with 1-Butanol $^{13}$C CP-MAS NMR Spectra of 500 nm Pure-Silica MFI Zeolite Particles
As-Made and Treated with 1-Butanol 13C CP-MAS NMR Spectra of 500 nm Pure-Silica MFI Zeolite Particles
As-Made Scanning Electron Microscopy Image of
Large Defect-Free Pure-Silica MFI Zeolite Crystal Powder XRD patterns of As-Made and Calcined Defect-Free Pure-Silica MFI Zeolite Crystals $^{29}$Si CP-MAS NMR Spectra of As-Made Defect-Free Pure-Silica MFI Zeolite Crystals $^{29}$Si MAS NMR Spectra of 200nm Pure-Silica MFI Zeolite Crystals with and without 1-Butanol Treatment CP-MAS NMR Spectra of 200nm Pure-Silica MFI Zeolite Crystals
with and without 1-Butanol Treatment Nitrogen Physisorption on 200nm Pure-Silica MFI Zeolite Crystals with and without 1-Butanol Treatment Scheme of Aliphatic Alcohol Treatment of
MFI Zeolite Crystals Utilizing 1-Butanol Scheme of Aliphatic Alcohol Treatment of
MFI Zeolite Crystals Utilizing 1-Hexanol

FUNCTIONALIZATION OF THE INTERNAL SURFACES OF ZEOLITES WITH ALCOHOL COMPOUNDS

This application claims the benefit of U.S. Provisional Application No. 61/135,313 filed Jul. 18, 2008.

FIELD OF THE INVENTION

The present invention relates to the modification of the internal surfaces of zeolite crystals via treatment with alcohol compounds containing at least four carbon atoms. The modified zeolites possess high thermal stability and the properties of the modified zeolites can be tailored to provide improved performance for use in separations processes.

BACKGROUND OF THE INVENTION

Molecular separation is an important process utilized in various industries, particularly in the production of fuels, chemicals, petrochemicals and specialty products. The separation of molecular compounds can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. Conversely, some molecular compounds can be separated by exploiting differences in the density, boiling points, melting points of the compounds, or by the selective chemisorption, physisorption, or solubility of certain compounds with selected solvent materials.

However, in recent years, zeolitic materials have proven to be exceptionally valuable materials in the field of molecular separations processes. Due to their high uniformity in pore size and crystalline structure, as well as their ability to withstand a wide range of operational conditions, zeolites and in particular adsorbent matrixes containing zeolites, are often materials of choice for use in selective molecular separations processes. Molecular separations processes such as Pressure Swing Adsorption (PSA), Temperature Swing Adsorption (TSA), Pressure/Temperature Swing Adsorption (PTSA), Rapid Cycle Pressure Swing Adsorption (RCPSA), Rapid Cycle Temperature Swing Adsorption (RCTSA), as well as Selective Membrane Separation processes are all well known in the art. In preferred embodiments of these processes, many of these processes utilize zeolites as part of the adsorbent matrixes due to their pore diameters in the microporous ranges (i.e., typically less than about 2 nm) which enables the zeolites to separate molecules and compounds at the molecular level. These processes utilizing zeolites as selective molecular adsorbents or "sieves" have rapidly gained prominence in modern industrial separations use also due to their relatively low cost, high molecular selectivity, high storage capacity, high surface areas, reasonable stabilities, and ease of regeneration among other beneficial properties.

Zeolites, possessing micropores of diameter <2 nm within their framework structures, have been widely used in separation processes and shape-selective catalysis, as well as in emerging applications such as mixed-matrix separation membranes and low-k dielectric materials among others. By incorporating covalently bound (as opposed to conventionally physisorbed) organic groups within the micropores, these highly ordered materials could be converted to organic-inorganic hybrids with potential for a diverse range of new applications, made possible by variations in structure and functionality of the incorporated organic moieties.

Significant progress has been made in the organic functionalization of ordered mesoporous materials (having larger pore diameters in the 2-50 nm range), ever since the first of such materials were reported in the 1990s. Functionalization of mesoporous materials is often achieved either by one of two routes: (i) direct synthesis via the sol-gel process, involving the co-condensation of organotrialkoxysilanes R—Si(OR')$_3$ or organochlorosilanes R—SiCl$_3$ with the tetraalkoxysilanes (Si—(OR)$_4$) that are the primary silica source for mesoporous material formation or (ii) post-synthesis modification via grafting the mesoporous material with silane coupling agents such as NH—(SiR)$_2$, Cl—SiR$_3$, or RO—SiR'$_3$. However, both of these approaches present difficulties in their application to zeolite materials. Direct co-condensation has been shown to lead to organic-functionalized zeolites in only rare cases, whereas the grafting of organic groups to the internal surfaces of zeolites using silane coupling agents is impeded by the small pore size of the zeolite (in many cases smaller than the molecular size of the coupling agents). When the latter technique is applied to functionalize the external surface, it also may lead to a decrease in accessible micropore volume due to the partial blockage of micropore entrances by the coupling agents and their reaction products.

Alternatively, the direct reaction of organic molecules such as alcohols with zeolite surfaces is attractive as a functionalization technique. It was reported by Iler that the esterification reaction of alcohols on silica particles can convert their hydrophilic external surfaces into hydrophobic surfaces (see Iler, R. K. *The Chemistry of Silica*; John Wiley & Sons: Toronto, Canada, 1979). Ballard et al. further investigated the reaction conditions for different alcohols, showing that the esterification of low-boiling alcohols on silica could be performed under autoclave conditions, whereas that of high-boiling alcohols could be conducted at elevated temperatures under ambient pressure and reflux conditions (see Ballard, C. C.; Broge, E. C.; Iler, R. K.; St. John, D. S.; McWhorter, J. R. *J. Phys. Chem.* 1965, 50, 20). More recently, Ishikawa et al. employed the esterification reaction of 1-butanol to probe the silanol group (Si—OH) density on the surface of mesoporous materials (see, Ishikawa, T.; Matsuda, M.; Tasukawa, A.; Kandori, K.; Inagaki, S.; Fukushima, T.; Kondo, S. *J. Chem. Soc., Faraday Trans.* 1996, 92, 1985). Others have applied the esterification reaction to tune the interlayer spacing of layered silicates. In addition, alcohol-functionalized mesoporous materials could further react with Grignard reagents (R—MgX, X ) Cl or Br), resulting in the formation of Si—C bonds on the internal surfaces of mesoporous materials. The hydrophobicity of the mesoporous materials treated with aliphatic alcohols was characterized by water adsorption measurements, showing that the water adsorption capacity decreased significantly after alcohol treatment. Mesoporous materials treated with aliphatic alcohols also demonstrated improved dispersion in organic solvents, possibly resulting from an increased hydrophobicity. In addition, it was found that the hydrophobicity increased with the alkyl group length and the alkyl group number density (the extent of esterification) (see, Ossenkamp, G. C.; Kemmitt, T.; Johnston, J. H. *Chem. Mater.* 2001, 13, 3975). However, the slow hydrolysis of alkoxy groups on esterified materials was also observed during water adsorption measurements, resulting in hysteresis during desorption (see, Kimura, T.; Kuroda, K.; Sugahara, Y.; Kuroda, K. *J. Porous Mater.* 1998, 5, 127).

On the other hand, the post-synthesis organic functionalization of zeolites—specifically of their internal pore surfaces—has been much less explored. For example, previous authors have reported the covalent attachment of methanol to the internal surfaces of pure-silica MFI zeolite, ascertained by a combination of techniques such as thermogravimetric analysis (TGA), IR, and NMR spectroscopy (see, Bosacek, V.; Klik, R.; Genoni, F.; Spano, G.; Rivetti, F.; Figueras, F. *Magn. Reson. Chem.* 1999, 37, S135; see also, Genoni, F.; Casati, G. P.; Buzzoni, R.; Palmery, S.; Spano, G.; Dalloro, L.; Petrini, G. *Collect. Czech. Chem. Commun.* 1997, 62, 1544; see also, Pelmenschikov, A. G.; Morosi, G.; Gamba, A.; Zecchina, A.; Bordiga, S.; Paukshtis, E. A. *J. Phys. Chem.* 1993, 97, 11979; see also, Bosacek, V. *J. Phys. Chem.* 1993, 97, 10732). It was suggested that methanol reacted with the silanol defect sites located in the zeolite structure forming ≡Si—O—CH3 linkages. The methyl group is small in size and can be expected to have only a limited effect in altering the properties of the material.

There is a need in the art for improved zeolitic materials for use in swing adsorption and/or membrane processes for the selective separation of molecular compounds. In particular, there is a need in the art for improved zeolitic materials which can be selectively modified and tailored for use in swing adsorption and/or membrane processes for the selective separation of specific molecular compounds.

SUMMARY OF THE INVENTION

The present invention involves alcohol-modified zeolite crystals that are modified through treatment with alcohol compounds wherein the alcohol compounds have a carbon content of at least 4 carbon atoms and a process for making the alcohol-modified zeolite crystals. In preferred embodiments of the present invention, the alcohol compounds are aliphatic. The alcohol-modified zeolites possess high thermal stability and the properties of the alcohol-modified zeolites can be tailored to provide improved performance for use in separations processes.

One embodiment of the present invention is an alcohol-modified zeolite wherein at least a portion of the internal pores are comprised of an esterified alcohol comprised of at least 4 carbon atoms. In a preferred embodiment of the present invention, the alcohol-modified zeolite possesses a crystalline structure comprised of at least 8-membered rings. In yet another preferred embodiment, the esterified alcohol is an aliphatic alcohol.

Another embodiment of the present invention is a process for making an alcohol-modified zeolite comprising the steps of:

a) contacting a zeolite with an alcohol comprised of at least 4 carbon atoms;

b) heating the zeolite-alcohol mixture at a temperature of from about 50 to about 200° C.;

c) separating an alcohol-treated zeolite from the zeolite-alcohol mixture; and d) drying the alcohol-treated zeolite;

thereby obtaining the alcohol-modified zeolite.

Yet another embodiment of the present invention is an alcohol-modified zeolite made by the process, comprising:

a) contacting a zeolite with an alcohol comprised of at least 4 carbon atoms;

b) heating the zeolite-alcohol mixture at a temperature of from about 50 to about 200° C.;

c) separating an alcohol-treated zeolite from the zeolite-alcohol mixture; and d) drying the alcohol-treated zeolite;

thereby obtaining the alcohol-modified zeolite.

DETAILED DESCRIPTION OF THE INVENTION

The present invention is directed to the composition and manufacture of modified zeolites whose internal pore structures are functionalized through modifications with alcohol compounds with a carbon content of at least 4 carbon atoms. The term "carbon content" as used herein is defined as the number of carbon atoms in a designated compound. For example, 1-butanol has a carbon content of 4. In preferred embodiments of the present invention, the alcohol compounds utilized are aliphatic. In even more preferred embodiments of the present invention, the aliphatic alcohol is selected from 1-butanol and 1-hextanol.

In preferred embodiments, these zeolites may be beneficial for use in molecular separations processes including, but not limited to, pressure and/or temperature swing adsorption processes, as well as selective membrane separation processes.

The alcohol-modified zeolites of the present invention can additionally be custom tailored to particular molecular separations by varying the either the starting zeolite utilized and/or the alcohol utilized for treatment in accordance with the present invention. The term "zeolites" is well known in the art and is a material containing oxygen bonded to other atoms which are most commonly silicon and aluminum, but also boron, phosphorus, and metal atoms, and which has a highly ordered (crystalline) structure, and which has pores/channels of size less than 2 nm included in the crystal structure. In preferred embodiments, the zeolites used in the present invention have at least one set of channels which have at least 8-memberd rings, and even more preferably at least 10-membered rings which are susceptible to functionalization of the inner pores with alcohols containing at least 4 carbon atoms as described herein. In a particularly preferred embodiment of the present invention, the zeolite has an IZA framework structure of MFI.

Figure 1A:
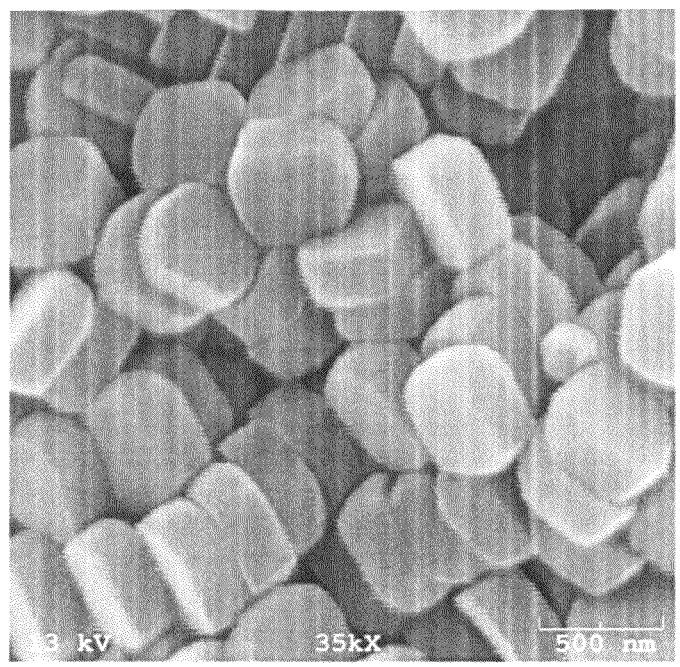
FIG. 1A is a Scanning Electron Microscopy (SEM) image of the as-synthesized (pre-calcined) 500 nm MFI Zeolite particles.
Figure 1B:
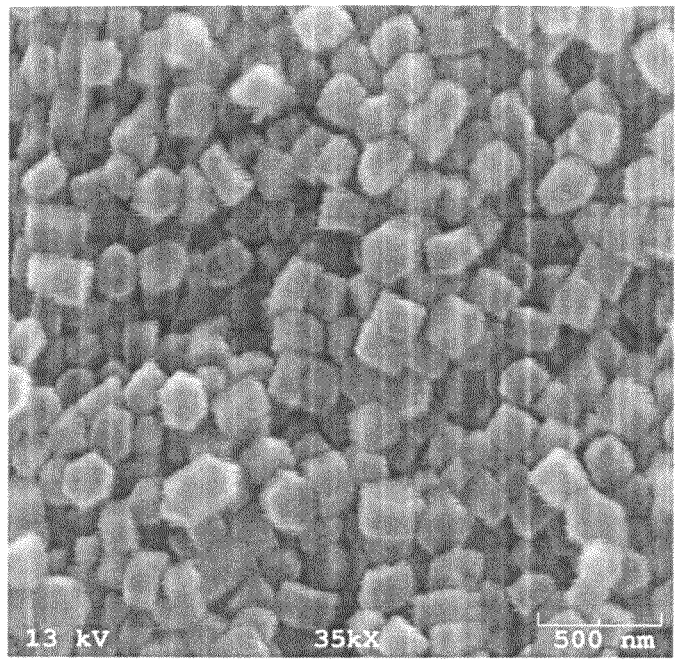
FIG. 1B is a Scanning Electron Microscopy (SEM) image of the as-synthesized (pre-calcined) 200 nm MFI Zeolite particles.
Figure 1C:
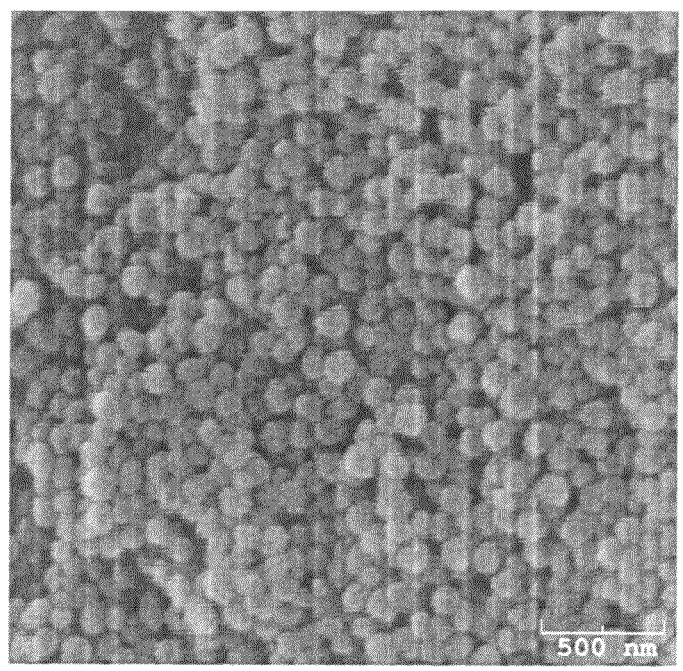
FIG. 1C is a Scanning Electron Microscopy (SEM) image of the as-synthesized (pre-calcined) 100 nm MFI Zeolite particles.

In the present invention, zeolite particles were prepared as described in Example 1. The particles used in the examples were pure-silica MFI zeolite particles. "MFI" is a zeolite framework type as defined by the International Zeolite Association ("IZA") in the *Atlas of Zeolite Framework Types* (Ch. Baerlocher, L. B. McCusker, D. H. Olson, Sixth Revised Edition, Elsevier Science B. V., Amsterdam, 2007) which is herein incorporated by reference. The particles were synthesized in 500 nm, 200 nm, and 100 nm crystal sizes. Scanning electron microscope (SEM) images of the synthesized crystals are shown in FIGS. 1A, 1B, and 1C, respectively. The zeolite crystals were further characterized as detailed in Example 2.

Figure 2:
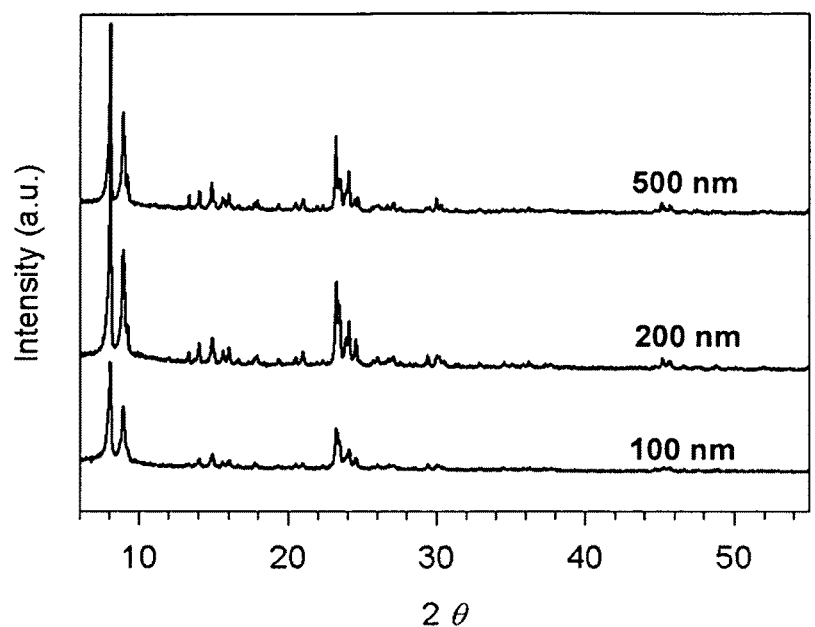
FIG. 2 shows the Powder X-Ray Diffraction patterns of the 500 nm, 200 nm, and 100 nm pure-silica MFI zeolite particles.

The 100 nm zeolite crystalline particles did not display a distinct morphology and are best described as spherical. However, larger particle sizes in the 200-500 nm range begin to exhibit a more well-defined prismatic morphology. Thus, the particle sizes were reported as the length of the prismatic crystals. The Powder XRD patterns of the 500 nm, 200 nm, and 100 nm crystals are shown in FIG. 2 and identify all the nanoparticle samples as possessing the MFI structure. Nitrogen physisorption data of the calcined pure-silica MFI samples show micropore volumes of about 0.15 cm$^3$/g. The micropore volumes are determined using the first plateau of the hysteresis occurring within the relative pressure range of 0.1-0.2. The micropore volume is determined as 0.19 cm$^3$/g when the physisorption is analyzed using the second plateau of the hysteresis. The hysteresis in the low relative pressure range is attributed to the phase transition of adsorbates. However, the hysteresis becomes less pronounced as the particle size decreases. The external specific surface area extracted from the physisorption data decreases (as expected) with increasing particle size.

The synthesized zeolite particles were treated as per the process of the present invention with the aliphatic alcohols 1-butanol and 1-heptanol as detailed in Example 3 herein. The modified zeolite particles were then analyzed and the results presented as follows.

Thermogravimetric Analysis ("TGA") was used to quantify the alcohol content of the functionalized materials. The as-made pure-silica MFI nanoparticles of the corresponding particle size were first used in control experiments.

TABLE 1

Organic Loading (mmol/g SiO$_2$) of Pure Silica MFI under Different Treatment Conditions as Measured by TGA

| Sample Treatment | Organic Weight Loss Temperature (° C.) | Organic Group | Organic Loading (mmol/g) - 100 nm particle | Organic Loading (mmol/g) - 200 nm particle | Organic Loading (mmol/g) - 500 nm particle |
| --- | --- | --- | --- | --- | --- |
| as-made particles | 340-520 | TPA | 0.72 | 0.72 | 0.7 |
| calcined particles treated with 1-butanol * | 280-400 | butyl | 0.91 | 0.75 | 0.69 |
| as-made particles treated with 1-butanol | 208-520 | TPA and butyl | 0.83 | 0.80 | 0.74 |

* NOTE:
For the n-butanol treated samples, the reported organic loadings were measured after the samples treated under vacuum for 2 hrs at 200° C. The reported organic loadings are essentially the same as those measured after the samples treated under vacuum for 2 hrs at room temperature.

As shown in Table 1 for three different particle sizes, the temperature range of the organic weight losses on the as-made materials is 340-520° C. and the TPA content is about 0.7 mmol/g SiO$_2$. The weight loss temperature range is in agreement with the published results (see Kragten, D. D.; Fedeyko, J. M.; Sawant, K. R.; Rimer, J. D.; Vlachos, D. G.; Lobo, R. F. *J. Phys. Chem. B* 2003, 107, 10006). The weight loss corresponds to about 3.6 TPA cations per unit cell, close to the theoretical value of 4 TPA cations per unit cell in the as-made MFI structure (see Flanigen, E. M.; Bennett, J. M.; Grose, R. W.; Cohen, J. P.; Patton, R. L.; Kirchner, R. M.; Smith, J. V. *Nature* 1978, 271, 512). For the calcined particles treated with n-butanol, the temperature range of the organic weight loss is 240-420° C., and the amount of weight loss changes with the particle size. For n-butanol treated samples, the organic loadings of the samples treated under vacuum at room temperature for 2 hrs and at 200° C. for 2 hrs individually were essentially the same. The organic loading decreases steadily with increasing particle size and stabilizes at about 0.7 mmol/g SiO$_2$ for the largest (500 nm) particles. This loading is almost identical to the TPA content of the corresponding as-made sample. The MFI crystal structure of the nanoparticles is not disturbed after the alcohol treatment (based on powder XRD patterns) but there are changes in the relative intensities of some peaks, as expected. For example, the relative intensities I(011)/I(051) and I(200)/I(051) decrease after being treated with n-butanol. Similar results are also observed in the XRD patterns of TPA-containing pure-silica MFI nanoparticles before and after calcination. For 100 nm particles, the butanol content is 0.91 mmol/g SiO$_2$, 27% higher than the TPA loading. This additional organic loading becomes more prominent when the particle size is further decreased to 50 nm, where a butanol loading of 1.10 mmol/g SiO$_2$ was observed.

These results clearly suggest that the alcohol loading due to functionalization of the external surface becomes more significant as the particle size decreases. To further examine this hypothesis, the n-butanol treatment was performed on the as-made materials and measured the organic weight losses. Given the measured negligible micropore volume of as-made pure-silica MFI, it was assumed that n-butanol molecules cannot access the internal surface due to the presence of TPA cations in the pore structure. Hence, it was assumed that n-butanol can only react with the silanol groups on the outer surface of the as-made zeolite particles. From Table 1, it is clear that the difference in total organic content between the as-made samples and the as-made n-butanol treated samples is large for the smaller particle sizes, and systematically decreases with increasing particle size. For the large crystal sizes, this difference is quite small (about 0.04 mmol/g), unexpectedly implying that almost all the n-butanol groups are functionalizing the internal sites in calcined samples. This result also corroborates the hypothesis that n-butanol molecules functionalize both the internal and external surface sites according to their particle size-dependent relative concentrations. Thus, the sum total of the above data supports the following two assertions. First, the TPA and butanol contents of the as-made and alcohol-treated materials match the proposed concentration of the internal silanol defect sites (see, Datka, J.; Tuznik, E. *Zeolites* 1985, 5, 230). In particular, there is approximately one internal silanol defect site per TPA cation, the defect sites are located at the intersections of the straight and sinusoidal channels as known from previous work, and each internal defect site is subsequently functionalized with approximately one butanol molecule. Secondly, since the as-made materials have inaccessible micropores due to the pore blocking of TPA cations, one can resolve the organic loadings on the internal defect sites and on the outer surface silanol groups by comparing the results from different particle sizes. It is believed that in the present invention that Si—O—$C_x$ bonds are formed in the pore structure of the modified zeolites wherein "x" is at least 4 (as in the case with modification via 1-butanol), and increases when higher carbon weight alcohol compounds are utilized in the modification process. These silanol defects are chemical entities composed of a silicon (Si) atom bonded to one, two, or three hydroxyl (—OH) groups, and with at least one bond to another silicon or aluminum (Al) atom through an oxygen bridge (Si—O—Si or Si—O—Al).

Figure 3:
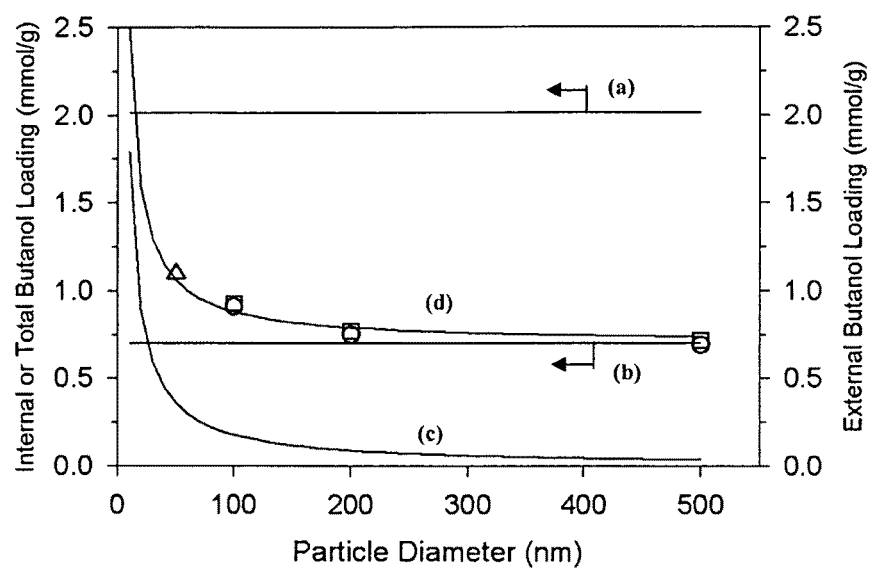
FIG. 3 shows a comparison of the theoretical calculations and experimental measurements of the 1-butanol loading on pure-silica MFI zeolite particles.

The above assertions are expressed more quantitatively in FIG. 3, which compares the TGA data to theoretical estimates for the internal and external surface butanol loadings. FIG. 3 illustrates a comparison of theoretical calculations and experimental measurements of the n-butanol loading on pure-silica MFI nanoparticles. In FIG. 3, Line "(a)" is the upper-bound liquid-like n-butanol loading within the micropores; Line "(b)" is the theoretical concentration of internal silanol defect sites (0.7 mmol/g $SiO_2$); Curve "(c)" is the theoretical concentration of external silanol groups each functionalized with one n-butanol molecule; and Curve "(d)" is the total theoretical n-butanol loading and is the sum of (b) and (c). The measured data of calcined samples treated with n-butanol in Table 1 are represented by the circular symbols in FIG. 3, whereas the measured data of the 0-day column in Table 3 are represented by the square symbols in FIG. 3. The measured data from 50 nm particles treated with n-butanol is represented by the triangle symbol in FIG. 3.

Since the concentration of the internal defect sites and the n-butanol loadings of pure-silica MFI nanoparticles are correlated, one can predict the particle size effect on the n-butanol loading. It is assumed that the particles are approximately spherical. The density of calcined pure-silica MFI is 1.78 $g/cm^3$ and its micropore volume was measured previously as 0.184 $cm^3/g$. Given the liquid density of n-butanol (0.81 $g/cm^3$), the maximum theoretical n-butanol loading within the micropores can be estimated as 2 mmol/g $SiO_2$, assuming that the micropores are filled with liquid-like n-butanol. This loading is independent of the particle size and also represents an approximate upper bound shown as Line (a) in FIG. 3. The concentration of internal defect sites, where the internal silanol groups are located, was calculated based on the theoretical TPA cation concentration, which is 4 TPA cations per unit cell (see, Datka, J.; Tuznik, E. *Zeolites* 1985, 5, 230). These assumptions lead to a (particle size-independent) theoretical estimate of 0.70 mmol/g $SiO_2$ of chemisorbed n-butanol loading in the internal sites (Line (b)). To quantify the loading on external sites, an external surface silanol density of 4 Si—OH/sq. nm was assumed (see, Rimer, J. D.; Lobo, R. F.; Vlachos, D. G. *Langmuir* 2005, 21, 8960; see also, Turro, N. J.; Lei, X.-G.; Li, W.; Liu, Z.; McDermott, A.; Ottaviani, M. F.; Abrams, L. *J. Am. Chem. Soc.* 2000, 122, 11649). If all the external sites are successfully functionalized, the theoretical estimate for n-butanol loading on the external surface is given by the (particle-size-dependent) Curve (c). Curve (d) represents the total theoretical n-butanol loading which is the sum of Curve (c) and Line (b). The measured total loading as a function of the particle size is also plotted in FIG. 3, and closely follows the theoretical predictions.

In addition, the particle size dependence of n-hexanol treatment was studied and the results are shown in Table 2.

TABLE 2

Organic Loading (mmol/g $SiO_2$) of Pure Silica MFI Treated with 1-Hexanol as Measured by TGA

| Particle Size (nm) | Organic Weight Loss Temperature (° C.) | Organic Loading (mmol/g $SiO_2$) |
|---|---|---|
| 50 | 250-520 | 1.34 |
| 100 | 250-520 | 1.28 |
| 300 | 250-520 | 1.14 |

As shown in Table 2, the n-hexanol loading shows a similar particle size dependence as that of n-butanol. However, a key difference is that the loadings are considerably higher than those using n-butanol. There may be several possible reasons for this. Such reasons include the possible existence of physisorbed molecules in the channels of MFI which are trapped due to the bulky hexyl groups of the molecules bound to the defect sites, or the formation of dimeric/oligomeric complexes due to hydrophobic interactions between long hexyl groups. The lower end (250° C.) of the weight loss temperature range is somewhat lower than that for n-butanol (280° C.) and may indicate the loss of physisorbed n-hexanol molecules. The higher end of the weight loss temperature range for n-hexanol (520° C.) overlaps (and even exceeds) that for n-butanol (400° C.), indicating that a significant number of n-hexanols are coordinated to the silanol defect sites.

Figure 4A:
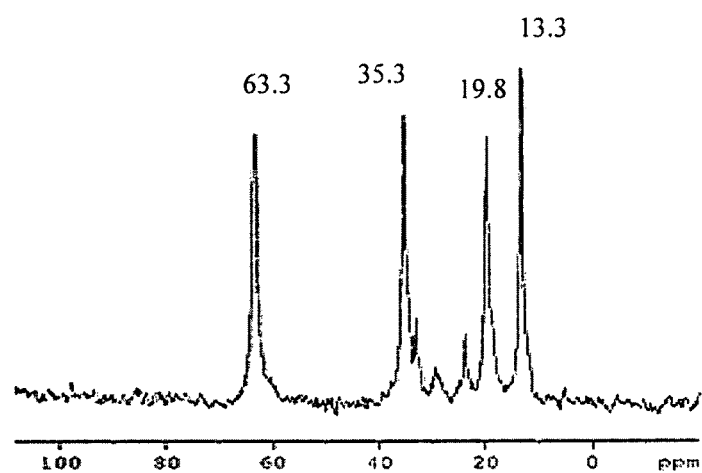
FIG. 4A is a $^{13}C$ CP-MAS NMR Spectra of calcined 500 nm pure-silica MFI zeolite particles that have been treated with 1-butanol in accordance with the present invention.
Figure 4B:
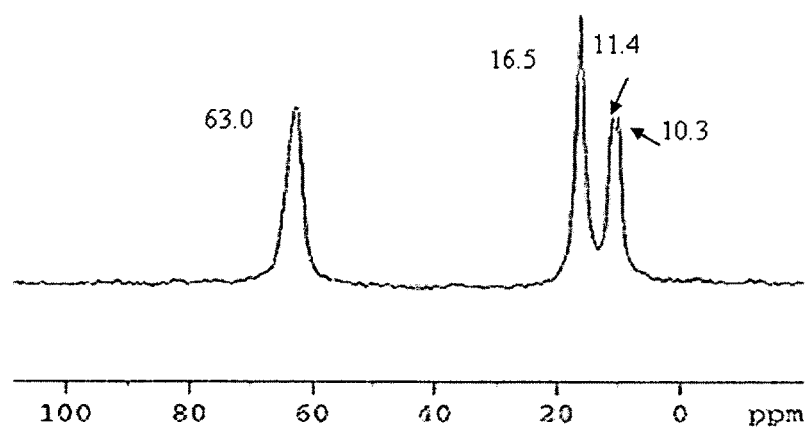
FIG. 4B is a $^{13}C$ CP-MAS NMR Spectra of as-made 500 nm pure-silica MFI zeolite particles that have been treated with 1-butanol in accordance with the present invention.
Figure 4C:
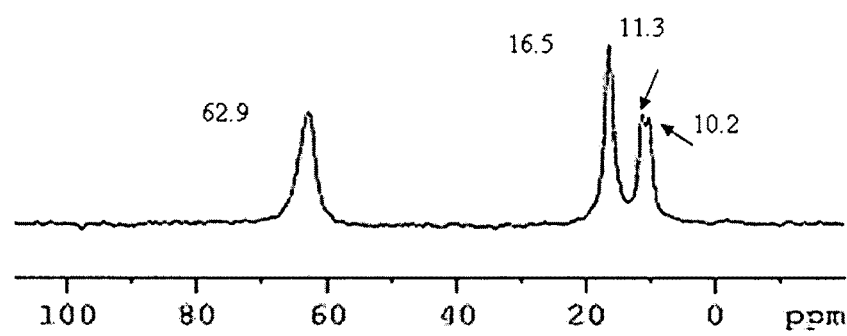
FIG. 4C is a $^{13}C$ CP-MAS NMR Spectra of as-made 500 nm pure-silica MFI zeolite particles for comparison.

Samples of the n-butanol-functionalized materials were utilized in the NMR investigations herein in order to study in more detail the chemical environment of the organic molecules in the zeolite structure. It is believed that the n-hexanol-functionalized materials lead to qualitatively similar results that may however be more difficult to interpret because of the comparatively higher complexity of these hybrid materials. The $^1$H MAS NMR spectrum of calcined 500 nm pure-silica MFI particles indicates the presence of physisorbed water molecules (chemical shift at 4.2 ppm) and hydrogen bonded silanol groups (around 8 ppm) in the framework. The presence of hydrogen-bonded silanol groups could be attributed to the silanol nests reported in pure-silica zeolite frameworks. After n-butanol treatment, the $^1$H MAS NMR spectrum of the MFI particles indicates the presence of organic groups in the framework (0.9 ppm) as well as isolated silanol groups (around 4 ppm). $^{13}$C CP-MAS NMR measurements were made on calcined 500 nm particles treated with n-butanol, as-made 500 nm particles treated with n-butanol, and as-made TPA-containing 500 nm particles and the resulting $^{13}$C CP-MAS NMR spectra are shown in FIGS. 4A, 4B, and 4C. The use of large particles allows us to minimize the relative contribution from external surface sites to the NMR signal. The spectrum in FIG. 4A shows chemical shifts at 64 ppm, 35 ppm, 20 ppm and 14 ppm, corresponding to the α, β, γ, and δ carbons of the n-butanol molecule respectively. The spectrum in FIG. 4C shows chemical shifts at 64 ppm, 18 ppm and 14 ppm, corresponding to α, β, and γ carbons of the TPA cations in the as-made sample. The splitting of the peak corresponding to the γ carbon is due to the interactions between these carbon atoms with the two types of channels in MFI structure. The spectrum in FIG. 4B shows that the chemical shifts of the as-made TPA-containing material treated with n-butanol are identical to those of the untreated as-made material in FIG. 4C, and hence there is negligible signal from butyl groups on the external surface. These results provide clear evidence that in the calcined 500 nm particles, almost all the 0.7 mmol/g $SiO_2$ of n-butanol loading is in the micropores.

Figure 5A:
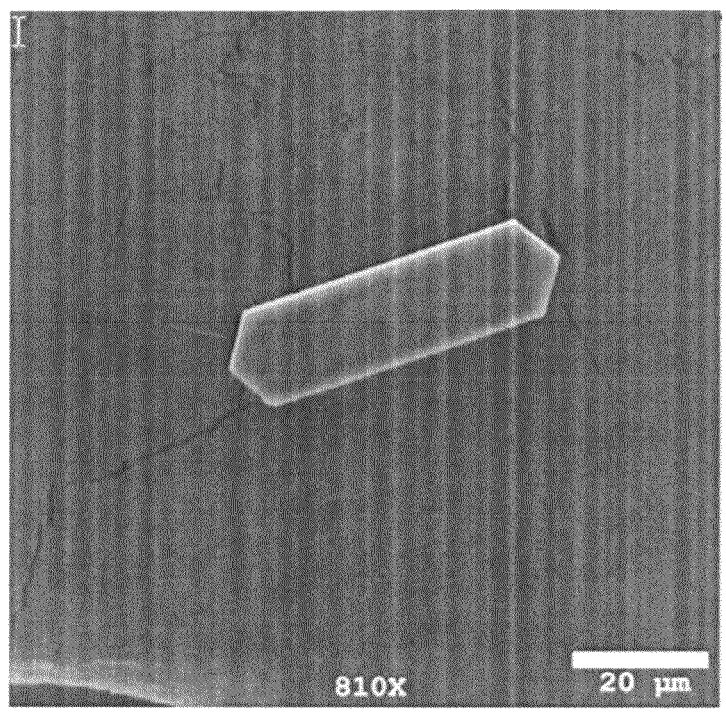
FIG. 5A is a Scanning Electron Microscopy (SEM) image of a large defect-free pure-silica MFI zeolite crystal.
Figure 5B:
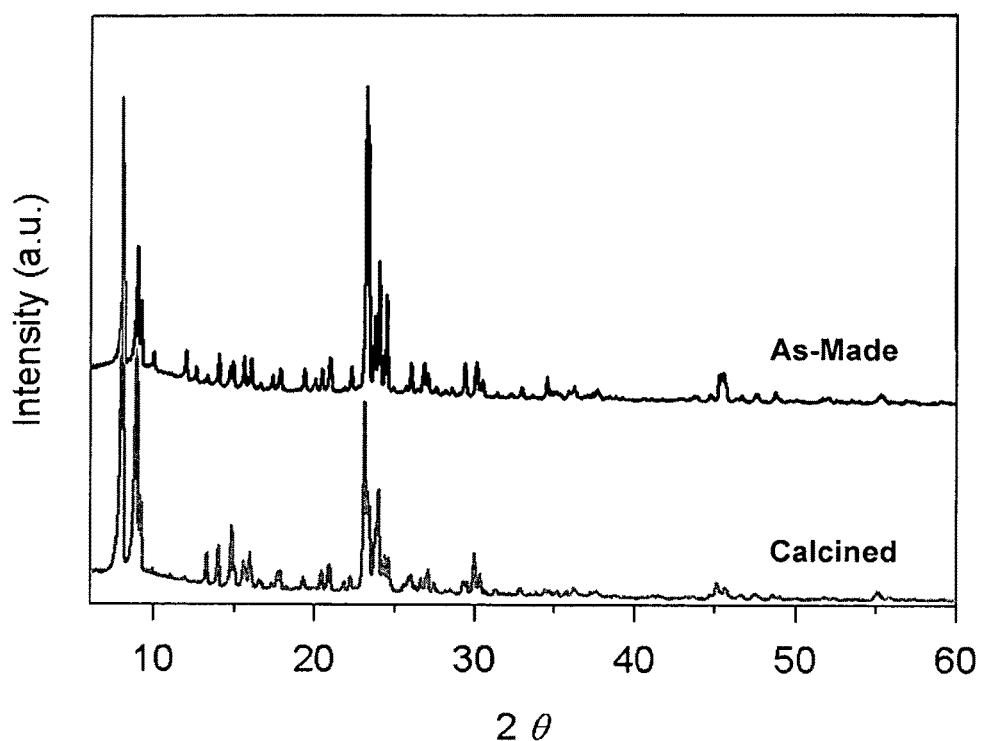
FIG. 5B shows the Powder X-Ray Diffraction patterns of the as-made and calcined versions of the defect-free pure-silica MFI zeolite crystals.
Figure 5C:
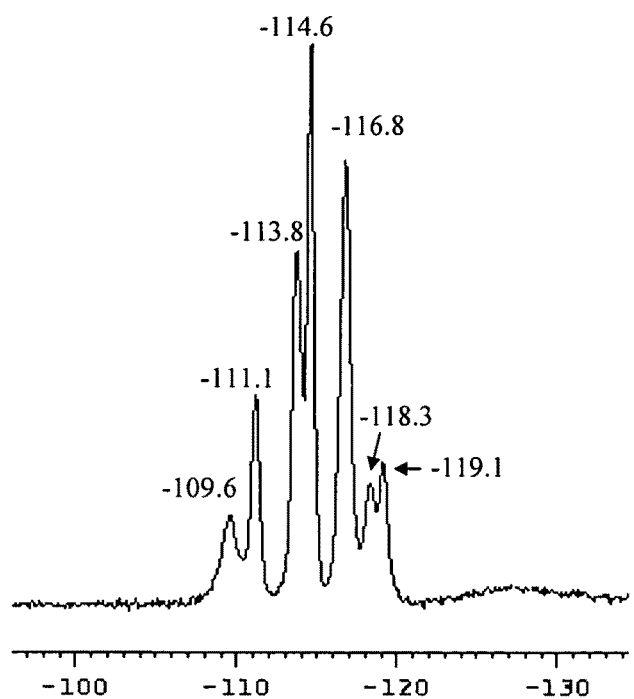
FIG. 5C shows the $^{13}C$ CP-MAS NMR Spectra of the as-made defect-free pure-silica MFI zeolite crystals.

To assess the hypothesis that the n-butanol molecules are located at silanol defect sites in the MFI pores, silanol-defect-free pure-silica MFI crystals were synthesized via the fluoride-mediated synthesis route (see Chezeau, J.-M.; Delmotte, L.; Guth, J.-L.; Soulard, M. *Zeolites* 1989, 9, 78; see also Koller, H.; Wolker, A.; Villaescusa, L. A.; Diaz-Cabanas, M. J.; Valencia, S.; Camblor, M. A. *J. Am. Chem. Soc.* 1999, 121, 3368, both of which are incorporated by reference) and performed n-butanol treatment on these crystals after calcination. FIG. 5A shows the SEM image of the as-made defect-free MFI particles, while FIGS. 5B and 5C show the powder XRD pattern and $^{29}$Si CP-MAS NMR spectrum, respectively of the as-made defect-free MFI particles. The crystal has a prismatic shape with a length of about 60 μm, so that external surface effects are negligible. The XRD pattern shows that the structure is MFI. The $^{29}$Si CP-MAS NMR spectrum shows that the structure contains only $Q^4$ silicon atoms within the framework and that there is negligible concentration of silanol defect sites. The multiple peaks within the $Q^4$ range are caused by distinct $TO_4$ sites within the MFI structure (see Chezeau, J.-M.; Delmotte, L.; Guth, J.-L.; Soulard, M. *Zeolites* 1989, 9, 78). TGA results show that the TPA content of the as-made defect-free crystals is 0.71 mmol/g $SiO_2$. After treating the calcined defect-free MFI sample with n-butanol, only small weight losses were observed within the temperature range of 280 to 420° C. (~0.04 mmol/g $SiO_2$). This result clearly suggests that the n-butanol molecules functionalizing the MFI particles (made by the conventional route) are coordinated with the silanol defect sites. The possibility of the alcohol hydrolyzing the Si—O—Si bridges of the MFI framework is very low under the current reaction conditions.

$^1$H—$^{29}$Si cross-polarization experiments generate enhanced signals from silicon nuclei bonded to OH groups, since they are located in close proximity to protons. This can give further information regarding the nature of binding of the butanol molecules, e.g., whether they form covalent Si—O—C bridges by condensation with silanol groups or whether they only form a strongly hydrogen-bonded complex with the silanol defect. In the literature, the formation of Si—O—C bonding on MFI nanoparticles was studied by methanol treatment and characterized by FTIR and $^{13}$C CP-MAS NMR (see Bosacek, V.; Klik, R.; Genoni, F.; Spano, G.; Rivetti, F.; Figueras, F. *Magn. Reson. Chem.* 1999, 37, S135; see also Genoni, F.; Casati, G. P.; Buzzoni, R.; Palmery, S.; Spano, G.; Dalloro, L.; Petrini, G. *Collect. Czech. Chem. Commun.* 1997, 62, 1544; see also Pelmenschikov, A. G.; Morosi, G.; Gamba, A.; Zecchina, A.; Bordiga, S.; Paukshtis, E. A. *J. Phys. Chem.* 1993, 97, 11979; see also Salehirad, F.; Anderson, M. W. *J. Catal.* 1998, 177, 189). As the concentration of methanol in the structure increased, the IR adsorption intensity of isolated silanol group (3800 cm$^{-1}$-3600 cm$^{-1}$) decreased while that of the C—H stretching band (3000 cm$^{-1}$-2800 cm$^{-1}$) increased simultaneously. In $^{13}$C CP-MAS NMR spectra, the formation of methoxy groups was supported by the appearance of chemical shifts at 48 and 49 ppm: the former caused by isolated methoxy groups while the later is indicative of hydrogen-bonded methoxy groups with nearby silanol groups. It is noteworthy that $^{29}$Si MAS NMR has rarely been applied to verify the nature of the bonding. Similar results have been observed for mesoporous materials treated with various aliphatic alcohols, wherein $^{13}$C CP-MAS NMR was intensely applied to verify the presence of alkoxy groups on the surface of materials by the chemical shift of 63 ppm from α carbon of alcohols. As $^{13}$C CP-MAS NMR was performed to verify the presence of n-butanol molecules on MFI nanoparticles, this issue was pursued by using $^{29}$Si MAS and $^{29}$Si CP-MAS NMR techniques.

Figure 6A:
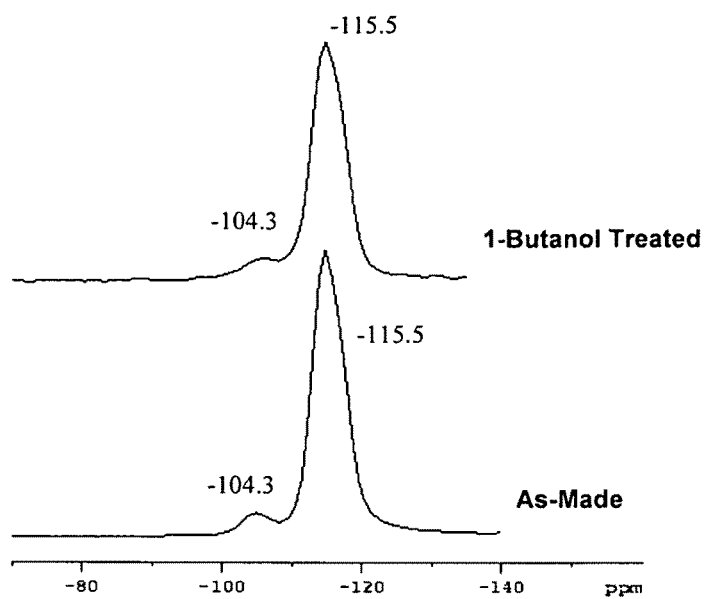
FIG. 6A shows the $^{29}Si$ MAS NMR Spectra of the 200 nm pure-silica MFI zeolite crystals with and without 1-butanol treatment.
Figure 6B:
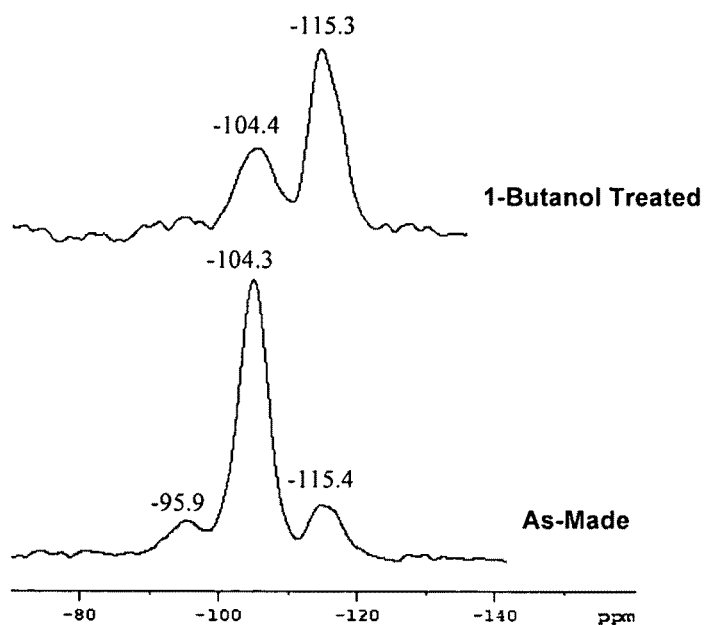
FIG. 6B shows the CP-MAS NMR Spectra of the 200 nm pure-silica MFI zeolite crystals with and without 1-butanol treatment.

To quantify the CP-MAS NMR signal, the peak intensity should be measured with an optimal contact time so that the magnetization can be effectively transferred from protons to silicon atoms. Test experiments indicated an optimal contact time of 5 ms to obtain spectra that allowed semi-quantitative comparisons of the $Q^3$:$Q^4$ population ratios in the samples. The $^{29}$Si MAS and CP-MAS NMR spectra of calcined 200 nm particles before and after n-butanol treatment are shown in FIGS. 6A and 6B, respectively. The $Q^3$:$Q^4$ ratio derived from the $^{29}$Si MAS NMR spectrum is about 0.06 irrespective of the n-butanol treatment. Thus no information on the nature of the organic-zeolite bonding could be ascertained from these spectra. On the other hand, the $Q^3$:$Q^4$ ratio of the $^{29}$Si CP-MAS NMR spectrum from the untreated samples is much higher (>5), as expected due to the enhancement of the $Q^3$ signal with cross-polarization. This ratio falls sharply to 0.56 after the n-butanol treatment. These results strongly support the hypothesis that the n-butanol molecules are covalently bonded to the MFI framework via an Si—O—R bond. The large reduction in the CP signal from the $Q^3$ groups suggests a reduction in the proton concentration due to condensation with the silanol groups and loss of water, rather than the formation of a hydrogen-bonded complex. The reduction in $Q^3$ signal is also consistent with the fact that the $^1$H—$^{29}$Si cross-polarization signal falls off rapidly as the $6^{th}$ power of the distance between the Si nuclei and the nearest protons. It would thus be expected to decrease in intensity (as is observed) when water molecules physisorbed at the defect sites are physically displaced by alkoxy (—O—R) groups and the silanol groups are chemically replaced by Si—O—R linkages. Similar results were obtained for 500 nm butanol-treated particles.

The observed $Q^3$:$Q^4$ ratio of 0.06 (corresponding to about 6 silanol groups per unit cell) is rather lower than the value of about 0.2 (corresponding to 16 silanol groups per unit cell) reported in some MFI materials that contain "silanol nest" defects (see Maciel, G. E.; Sindorf, D. W. *J. Am. Chem. Soc.* 1980, 102, 7606). Although not wishing to be held to any particular theory, these are thought to be a result of missing Si atoms in the lattice, each such missing atom leading to a "nest" of four silanol groups belonging to the four surrounding Si atoms. On the other hand, the currently obtained $^{29}$Si MAS NMR spectrum more closely resembles that reported by other workers (see Zhao, X. S.; Lu, G. Q.; Whittaker, A. K.;

Millar, G. J.; Zhu, H. Y. *J. Phys. Chem. B* 1997, 101, 6525) who interpret the defects in terms of uncondensed silanols. There are debates regarding the precise nature and concentration of the internal silanol defects, e.g., whether they mainly arise from silanol nests or from uncondensed silanols resulting from local disorder in the lattice, and whether or not they can be annealed upon heating/calcination thereby reducing the number of $Q^3$ Si atoms. However, the present invention is specifically concerned with functionalizing MFI materials by exploiting the fact that these defects involve silanol groups, irrespective of their origin and precise structure.

The binding strength of the alkoxy groups was further tested by maintaining the samples under vacuum (10 millitorr), at room temperature for 2 days and then at 200° C. for an additional 2 days. The n-butanol loadings after each stage were measured by TGA and the results are summarized in Table 3.

TABLE 3

Organic Content (mmol/g) of Alcohol-Treated Samples Exposed to High-Vacuum and High-Temperature Environments

| Particle Size | | Room Temperature and 10 mTorr | | 200° C. and 10 mTorr |
|---|---|---|---|---|
| (nm) | Treatment | 0 days | 2 days | 2 days |
| 500 | reflux with 1-butanol for 48 h | 0.72 | 0.69 | 0.67 |
| 200 | reflux with 1-butanol for 48 h | 0.77 | 0.79 | 0.77 |
| 100 | reflux with 1-butanol for 48 h | 0.93 | 0.87 | 0.73 |
| 100 | reflux with 1-hexanol for 48 h | 1.12 | 1.13 | 1.07 |

The n-butanol loadings on the calcined particles (Table 1 and Table 3) are comparable, indicating that the results are reproducible, as also illustrated in FIG. 3. The organic loadings on 500 nm and 200 nm particles are slightly decreased (7% for 500 nm particles and 3% for 200 nm particles). For 100 nm particles, the organic loading decreased from 0.93 to 0.73 mmol/g $SiO_2$. These results are interpreted as being consistent with the hypothesis that the remaining butoxy groups (~0.7 mmol/g $SiO_2$) are covalently bonded to the internal silanol defect sites. In the case of the 100 nm particles, the results also imply that the butoxy groups on the external surface were easily removed by a combined vacuum and thermal treatment, so that the final organic loading corresponds to the value expected from only the presence of the functionalized internal surface sites. It is further interesting to note that n-hexanol treated 100 nm particles also demonstrate good thermal stability based on the similar organic loadings measured after each treatment step, as shown in Table 3. However, no substantial decrease in the organic loading was observed after heating n-hexanol treated particles at 200° C. under vacuum for 2 days. The reason for this behavior is still unclear; however, it is consistent with the aforementioned suggestion regarding the formation of dimeric/oligomeric complexes or n-hexanol molecules trapped in the MFI channels.

Figure 7:
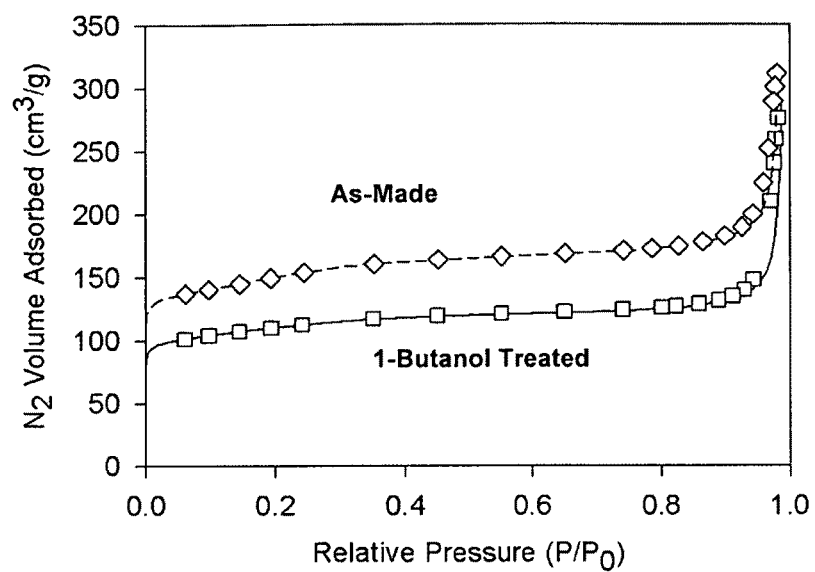
FIG. 7 shows the nitrogen physisorption of the 200 nm pure-silica MFI zeolite crystals with and without 1-butanol treatment.

With the hypothesis that alcohol molecules are covalently bonded to the internal defect sites within micropores, smaller micropore volumes of alcohol-treated samples should be expected in comparison to untreated calcined MFI This hypothesis is supported examining the results of the nitrogen physisorption measurements of the 200 nm pure-silica MFI zeolite crystals without 1-butanol treatment ("as-made") as compared to the 200 nm pure-silica MFI zeolite crystals with 1-butanol treatment as shown in FIG. 7.

TABLE 4

Microporous Volumes and Organic Loadings of Alcohol-Treated Samples

| Particle Size (nm) | Treatment | Organic Loading (mmol/g $SiO_2$) | Micropore Volume ($cm^3$/g) * |
|---|---|---|---|
| 200 | reflux with 1-butanol for 48 h | 0.7 | 0.115 |
| 100 | reflux with 1-hexanol for 48 h | 1.03 | 0.075 |

* NOTE:
The measured micropore volume of calcined pure-silica MFI particles before R—OH treatment is 0.146 $cm^3$/g.

Figure 8A:
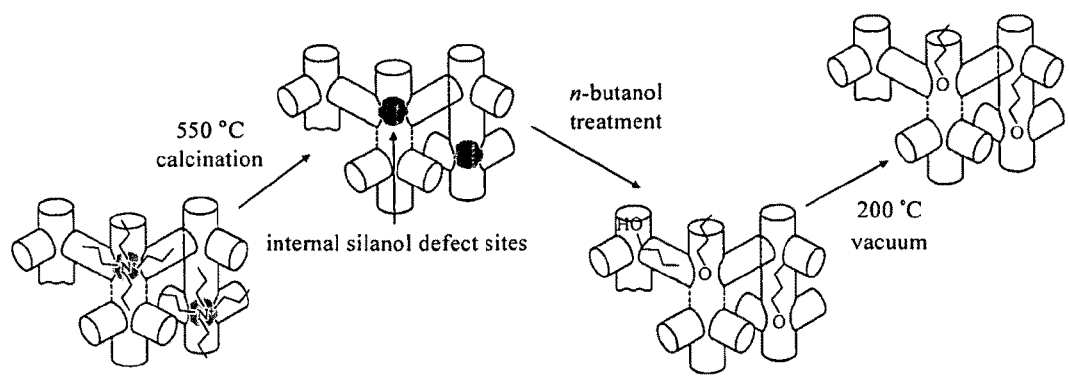
FIG. 8A shows a schematic of the believed reaction pathways for the aliphatic alcohol treatment of the MFI zeolite crystals utilizing 1-butanol.
Figure 8B:
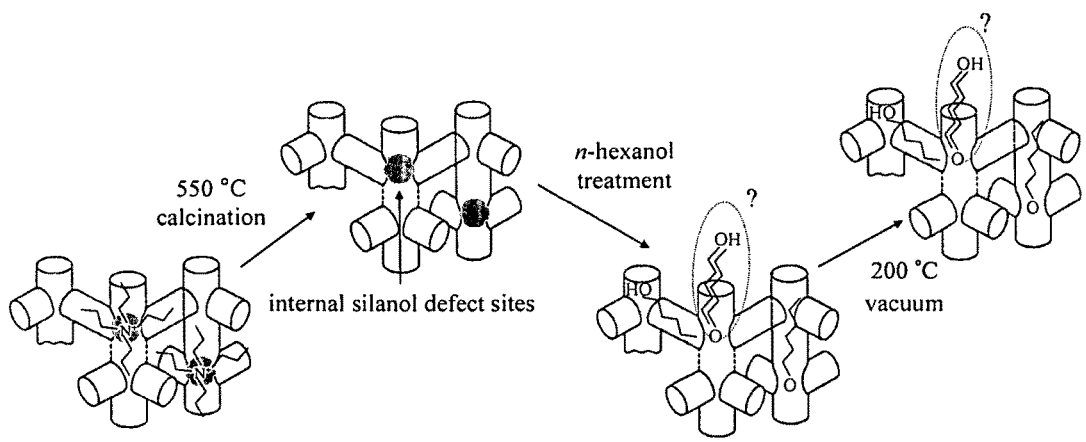
FIG. 8B shows a schematic of the believed reaction pathways for the aliphatic alcohol treatment of the MFI zeolite crystals utilizing 1-hexanol.

As shown in Table 4, the organic loading for n-butanol treated 200 nm particles after $N_2$ physisorption is 0.7 mmol/g $SiO_2$, or about 30% of the available pore volume. The micropore volume of the n-butanol treated sample is 0.115 $cm^3$/g, which is about 21% smaller than that measured for the blank nanoparticles (0.146 $cm^3$/g). Measurements of p-xylene uptake yield a 30% decrease in pore volume for the n-butanol treated samples. For n-hexanol treated 100 nm particles, the organic loading after $N_2$ physisorption is 1.03 mmol/g $SiO_2$ and the micropore volume further decreases to 0.075 $cm^3$/g compared with that of the n-butanol treated sample, resulting from the longer aliphatic chain length of n-hexanol molecules. The micropore volumes obtained from the aliphatic alcohol treated pure-silica MFI particles obey the expected trends and supports the assumption that the functionalization occurs primarily within the zeolite micropores. Preliminary water adsorption measurements were also made on the n-butanol functionalized materials, which showed a 50% decrease in water uptake (in comparison to calcined MFI crystals) at room temperature and relative vapor pressures below 0.2. At higher pressures, the water uptake was progressively increased due to slow hydrolysis of the Si—O—C bonds and loss of the alcohol molecules from the material. More detailed water uptake studies on n-butanol and n-hexanol treated samples may he required to fully determine the degree of low-humidity operation that may be required for application of these materials. The analysis of the present invention was focused on combining TGA, $^{13}C/^{29}Si$ MAS NMR, $^{29}Si$ CP-MAS NMR, and $N_2$ physisorption measurements to clearly demonstrate that aliphatic alcohol molecules can be covalently bonded to almost exclusively the internal silanol detect sites (n-butanol case), or to both the internal silanol defect sites and external silanol groups (n-hexanol case). FIGS. 8A and 8B illustrate the believed reaction pathways for the aliphatic alcohol treatment of the MFI zeolite crystals utilizing 1-butanol and 1-hexanol, respectively.

CONCLUSIONS

The micropores of pure-silica MFI nanoparticles were successfully functionalized with n-butanol and n-hexanol by reflux treatment ("azeotropic distillation") under neat conditions. This reaction condition is much milder than that used for previous functionalization studies with methanol. The n-butanol functionalized material was selected for detailed quantitative studies employing a range of MFI particle sizes. The combined interpretation of the characterization data from TGA, $^{13}C/^{29}Si$ CP-MAS NMR, and $N_2$ physisorption, as well as theoretical estimates, support the assertion that the n-butanol molecules are mostly located within micropores and are covalently attached to the internal silanol defect sites. The n-butanol loadings within the micropores are independent of the particle size, while significant n-butanol loadings on the external surface can be observed when the particle size is smaller than 100 nm. The results for n-hexanol functionalized MFI are qualitatively similar. The functionalized materials also exhibit good thermal stability under vacuum. The successful functionalization with sizable organic groups makes the pore structure of the resulting hybrid material considerably different from the original zeolite. The current technique therefore shows potential as a way to create tunable zeolite materials with new functionalities for separations, catalysis, and other applications.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the synthesis and the adsorption properties of a few select zeolitic imidazolate framework materials to illustrate the benefits of the present invention. These Examples only illustrate specific embodiments of the present invention and are not meant to limit the scope of the current invention.

EXAMPLES

Example 1

Zeolite Synthesis

In this example, the following chemicals were commercially available and were used as received: tetraethylorthosilicate (TEOS, 98% Sigma-Aldrich™) tetrapropylammonium hydroxide (TPAOH, 40% w/w aqueous solution, Alfa Aesar™), and tetrapropylammonium bromide (TPABr, 98%, Sigma-Aldrich™), ammonium fluoride ($NH_4F$, >96%, Alfa Aesar™), hexanes (ACS grade, EMD™), n-butanol (ACS grade, >99.4%, J. T. Baker™), n-hexanol (Reagent grade, >98%, Aldrich™). The alcohols were further dried through prescribed drying procedures (see Armarego, W. L. F.; Chia, C. L. L. *Purification of Laboratory Chemicals*, 5th ed.; Elsevier, 2003, which is herein incorporated by reference). Cab-O-Sil M-5 was obtained from Cabot Corporation™.

The procedures published by Schoeman were used to synthesize pure-silica MFI nanoparticles (see Carr, C. S.; Kaskel, S.; Shantz, D. F. *Chem. Mater.* 2004, 16, 3139; see also Schoeman, B. J. *Stud. Surf Sci. Catal.* 1997, 105, 647, both of which are incorporated herein by reference). TEOS was used as the silica source and TPAOH was used as the structure-directing agent (SDA). The molar ratio of the precursor solution was 1 TEOS: 0.36 TPAOH:x $H_2O$. After the mixture was aged at room temperature for 24 hrs, it was placed under hydrothermal reaction conditions for the designated synthesis duration. For example, to synthesize 500 nm pure-silica MFI particles (with x=180), 25 g of TEOS was added dropwise into 21.53 g of TPAOH solution while stirring. The mixture was stirred vigorously for 1 hr, and became completely transparent. To this mixture, 368.12 g of de-ionized water was added to the transparent solution and was kept on stirring vigorously for another 24 hrs. The resulting mixture was transferred to a 700-ml autoclave reactor (HR-700, Berghof Inc.™) to perform the hydrothermal reaction. The temperature was 150° C. and the synthesis duration was set as 48 hrs. The resulting suspension was centrifuged at 8000 rpm for 20 mins (Fisher™ accuSpin® Model 400 equipped with a 6-place 45° fixed-angle rotor) and the supernatant was discarded. The solid was re-dispersed into de-ionized water by sonication and was centrifuged afterward. This centrifugation-sonication cycle was repeated until the pH of the supernatant was below 8. The re-dispersed nanoparticles were dried at room temperature. This as-synthesized material was calcined at 550° C. for 8 hrs in air. To synthesize 200 nm silicalite particles, the water content of the precursor solution (x) was set to 20, the hydrothermal reaction temperature was 150° C. and the synthesis duration was 96 hrs. To synthesize 100 nm silicalite particles, the water content of the precursor solution (x) was set to 20, the hydrothermal reaction temperature was 95° C. and the synthesis duration was 48 hrs. To synthesize defect-free pure-silica MFI crystals, a fluoride-mediated synthesis route was followed (see Chezeau, J.-M.; Delmotte, L.; Guth, J.-L.; Soulard, M. *Zeolites* 1989, 9, 78, see also Fyfe, C. A.; Brouwer, D. H.; Lewis, A. R.; Chezeau, J.-M. *J. Am. Chem. Soc.* 2001, 123, 6882). First, 0.81 g TPABr and 0.058 g $NH_4F$ were dissolved in 13.44 g DI water. The mixture was stirred at room temperature for 10 mins. Then, 2.24 g of Cab-O-Sil® was added to the TPABr-$NH_4F$—$H_2O$ mixture and blended manually for 10 mins to obtain a homogeneous gel. This gel was transferred to a 20 ml autoclave. The reactor was placed in a synthesis oven preheated at 180° C. statically for 14 days. The resulting solids were washed with de-ionized water several times after the autoclave was cooled down to room temperature.

Example 2

Zeolite Characterization

Scanning electron microscope (SEM) images of the synthesized crystals are shown in FIGS. 1A, 1B, and 1C, respectively. These images were taken on a Hitachi S-800 operating at 13 kV. Powder X-ray diffraction (PXRD) patterns were obtained on a Philips™ X'pert Diffractometer® equipped with X'celerator® using CuKα radiation. Samples were analyzed over a range of 4-55° 2θ with a step size of 0.02°. Thermogravimetric analysis (TGA) was performed on a Netzsch™ STA409. Samples were heated under a nitrogen and air stream from 30 to 900° C. at a rate of 10° C./min. The organic loading was estimated from the weight loss within the range of 240 to 420° C. for n-butanol-treated samples, within the range of 250 to 520° C. for hexanol-treated samples, and within the range of 340 to 540° C. for as-made samples. $^1H/^{29}Si$ MAS and $^{29}Si$ CP-MAS NMR measurements were performed on a Bruker™ DSX300 spectrometer operating at 59.64 MHz with a MAS rate of 5 kHz. Spectra were acquired using a 7 mm probe with $ZrO_2$ rotors, and a 10 s recycle delay. Chemical shifts were referenced to 3-(trimethylsilyl)-1-propanesulfonic acid sodium salt. $^{13}C$ CP-MAS spectra were recorded at 38.45 MHz on a Bruker™ DSX300 with a spinning rate of 5 kHz. FT-IR/FT-Raman spectra were obtained on a Bruker™66 v/s/FRA-106. Pelletized pure KBr was used as the background and was subsequently subtracted from the spectrum of the pelletized sample and KBr mixture. A collection of 1024 scans was acquired per spectrum. Nitrogen adsorption measurements were performed on a Micromeritics™ ASAP 2020 micropore analyzer. About 0.1-0.2 g of sample was degassed under vacuum at 200° C. for 18 h. The measurements were conducted in a liquid nitrogen bath at 77 K. The micropore volume was determined by the t-plot method.

Example 3

Zeolite Surface Treatment per the Present Invention

All the alcohol treatments were performed under neat conditions as illustrated by the following example. In a 100-ml round bottom flask, 0.5 g of calcined or as-synthesized MFI nanoparticles (500 nm, 200 nm or 100 nm) were degassed at 200° C. for 6 hrs on a Schlenk™ line (~15 millitorr). The degassed MFI nanoparticles were transferred into a glove box, where approximately 10 g of dried n-butanol was added to the MFI particles in a round-bottom flask sealed with a valve. The whole setup was brought out of the glove box and connected to a distillation head (ChemGlass Inc.™ CG-1237-01) that had been dried at 120° C. for 30 mins in an oven and then purged with argon for several minutes on a Schlenk™ line. The round-bottom flask was immersed in a silicone oil bath (108° C. to about 115° C.) for 48 hrs. However, in the present invention, it should be noted that temperatures of about 50 to about 200° C. may be used in this step of the process depending upon the alcohol compound utilized. The resulting material was centrifuged and re-dispersed in hexane under sonication. The washing-redispersion cycle was repeated 3 times. The re-dispersed particles were first dried by rotovaporation and then degassed on a Schlenk™ line at room temperature for 2 hrs before performing TGA characterization. All the n-hexanol treatments were performed using a similar procedure as that described above for n-butanol.

What is claimed is:

1. An alcohol-modified zeolite wherein at least a portion of the internal pores are comprised of an esterified alcohol comprised of at least 4 carbon atoms.

2. The alcohol-modified zeolite of claim 1 wherein the crystalline structure of the zeolite is comprised of at least 8-membered rings.

3. The alcohol-modified zeolite of claim 1, wherein the alcohol is an aliphatic alcohol.

4. The alcohol-modified zeolite of claim 1 wherein the pore diameters of the zeolite are less than 2 nm.

5. The alcohol-modified zeolite of claim 1, wherein the alcohol is esterified by reaction with a silanol defect site.

6. The alcohol-modified zeolite of claim 3, wherein the alcohol is esterified by reaction with a silanol defect site.

7. The alcohol-modified zeolite of claim 1, wherein the IZA framework crystalline structure of the zeolite is MFI.

8. The alcohol-modified zeolite of claim 3, wherein the IZA framework crystalline structure of the zeolite is MFI.

9. The alcohol-modified zeolite of claim 1, wherein the alcohol is esterified with a silanol defect site forming a Si—O—$C_x$ linkage wherein x is greater than or equal to 4.

10. The alcohol-modified zeolite of claim 3, wherein the aliphatic alcohol is esterified with a silanol defect site forming a Si—O—$C_x$ linkage wherein x is greater than or equal to 4.

11. The alcohol-modified zeolite of claim 10, wherein the crystalline structure of the zeolite is comprised of at least 8-membered rings.

12. The alcohol-modified zeolite of claim 11, wherein the IZA framework crystalline structure of the zeolite is MFI.

13. The alcohol-modified zeolite of claim 3, wherein the alcohol is selected from 1-butanol and 1-hexanol.

14. The alcohol-modified zeolite of claim 8, wherein the alcohol is selected from 1-butanol and 1-hexanol.

15. The alcohol-modified zeolite of claim 1, wherein the zeolite has been calcined or otherwise treated to remove any organic species physisorbed within the pores, prior to reaction with the alcohol.

16. A process for making an alcohol-modified zeolite, comprising:
   a) contacting a zeolite with an alcohol comprised of at least 4 carbon atoms;
   b) heating the zeolite-alcohol mixture at a temperature of from about 50° C. to about 200° C.;
   c) separating an alcohol-treated zeolite from the zeolite-alcohol mixture; and
   d) drying the alcohol-treated zeolite; thereby obtaining the alcohol-modified zeolite.

17. The process of claim 16, wherein the zeolite is calcined prior to step a).

18. The process of claim 16, wherein the zeolite is degassed prior to step a).

19. The process of claim 16, further comprising:
   e) degassing the dried alcohol-treated zeolite obtained from step d), prior to obtaining the alcohol-modified zeolite.

20. The process of claim 16, wherein the crystalline structure of the zeolite is comprised of at least 8-membered rings.

21. The process of claim 16, wherein the crystalline structure of the zeolite is comprised of at least 10-membered rings.

22. The process of claim 16, wherein the IZA framework crystalline structure of the zeolite is MFI.

23. The process of claim 16, wherein the alcohol is an aliphatic alcohol.

24. The process of claim 22, wherein the alcohol is an aliphatic alcohol.

25. The process of claim 16, wherein the alcohol is selected from 1-butanol and 1-hexanol.

26. The process of claim 24, wherein the alcohol is selected from 1-butanol and 1-hexanol.

27. An alcohol-modified zeolite made by the process, comprising:
   a) contacting a zeolite with an alcohol comprised of at least 4 carbon atoms;
   b) heating the zeolite-alcohol mixture at a temperature of from about 50° C. to about 200° C.;
   c) separating an alcohol-treated zeolite from the zeolite-alcohol mixture; and
   d) drying the alcohol-treated zeolite; thereby obtaining the alcohol-modified zeolite.

28. An alcohol-modified zeolite made by the process of claim 27, wherein the crystalline structure of the zeolite is comprised of at least 8-membered rings.

29. An alcohol-modified zeolite made by the process of claim 27, wherein the IZA framework crystalline structure of the zeolite is MFI.

30. An alcohol-modified zeolite made by the process of claim 27, wherein the alcohol is an aliphatic alcohol.

31. An alcohol-modified zeolite made by the process of claim 29, wherein the alcohol is selected from 1-butanol and 1-hexanol.

32. An alcohol-modified zeolite made by the process of claim 30, wherein the aliphatic alcohol is selected from 1-butanol and 1-hexanol.

* * * * *